(12) United States Patent  
Fischer et al.

(10) Patent No.: US 7,107,594 B1  
(45) Date of Patent: Sep. 12, 2006

(54) METHOD AND SYSTEM FOR PROVIDING A VERSION-INDEPENDENT INTERFACE TO A COMPUTER RESOURCE

(75) Inventors: Jeffrey Fischer, San Francisco, CA (US); Heung-Wah Yan, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 656 days.

(21) Appl. No.: 10/247,258

(22) Filed: Sep. 18, 2002

Related U.S. Application Data

(60) Provisional application No. 60/392,248, filed on Jun. 27, 2002.

(51) Int. Cl.
*G06F 3/00* (2006.01)
*G06F 7/00* (2006.01)
*G06F 17/00* (2006.01)
*G06F 13/00* (2006.01)

(52) U.S. Cl. ............... 719/310; 707/102; 707/203; 715/762; 715/968; 719/328; 719/330

(58) Field of Classification Search ............ 717/106, 717/108, 110, 114, 116, 120–122, 168–178; 715/513, 511; 719/310, 313, 315, 328; 707/1–2, 707/100, 102, 103 R, 103 Y, 103 Z, 200, 707/203

See application file for complete search history.

(56) References Cited

U.S. PATENT DOCUMENTS

| | | | | |
|---|---|---|---|---|
| 5,375,206 A | * | 12/1994 | Hunter et al. ............... | 717/176 |
| 5,481,713 A | * | 1/1996 | Wetmore et al. ............ | 717/170 |
| 5,550,971 A | * | 8/1996 | Brunner et al. ............... | 707/3 |
| 5,627,979 A | * | 5/1997 | Chang et al. ............... | 715/763 |
| 5,734,899 A | * | 3/1998 | Yoshizawa et al. .......... | 707/203 |
| 5,915,112 A | * | 6/1999 | Boutcher .................... | 719/330 |
| 5,991,871 A | * | 11/1999 | Zucker ....................... | 712/233 |
| 6,002,864 A | * | 12/1999 | Heyman ....................... | 703/23 |
| 6,065,041 A | * | 5/2000 | Lum et al. .................. | 709/203 |
| 6,074,432 A | * | 6/2000 | Guccione .................... | 717/108 |
| 6,101,556 A | * | 8/2000 | Piskiel et al. ............... | 719/313 |
| 6,871,345 B1 | * | 3/2005 | Crow et al. .................. | 717/175 |

OTHER PUBLICATIONS

Ensink et al., XML based Adaptation of the Composite Approach for Database Integration, Mar. 1999, ACM Souteast Regional Conference.*

* cited by examiner

*Primary Examiner*—Antony Nguyen-Ba
(74) *Attorney, Agent, or Firm*—Campbell Stephenson Ascolese LLP

(57) ABSTRACT

A method and system for exposing a version-independent interface to a computer resource. The interface system exposes a version-independent interface to a computer resource, such as a database or computer program. The interface system also provides a version-dependent interface to the computer resource that is typically not exposed. When the computer resource is modified, the version-dependent interface may be modified, but the version-independent interface might not be modified. When the version-dependent interface is modified, a mapping is generated (in some cases automatically) between the version-independent interface and the version-dependent interface. When an accessing computer program uses the version-independent interface to request services of the computer resource, the system uses the mapping to map the request to a request that is appropriate for the version-dependent interface.

34 Claims, 8 Drawing Sheets

```
        < COMMAND NAME = UPDATE >
            < ACCOUNT >
601             < NAME > ACME < /NAME
                < ORG > SALES < /ORG >
            < /ACCOUNT >
        < /COMMAND >

< COMMAND NAME = UPDATE >
            < ACCOUNT >
602             < NAME > ACME < /NAME >
                < ORG >
                    < NAME > SALES < /NAME >
                < /ORG >
            < /ACCOUNT >
        < /COMMAND >
```

*Fig. 6*

METHOD AND SYSTEM FOR PROVIDING A VERSION-INDEPENDENT INTERFACE TO A COMPUTER RESOURCE

CROSS-REFERENCE TO RELATED APPLICATIONS

This application claims the benefit of provisional U.S. Patent Application No. 60/392,248, filed Jun. 27, 2002, which is hereby incorporated by reference in its entirety.

TECHNICAL FIELD

The described technology relates generally to interfaces to computer resources and particularly to updating of such interfaces.

DETAILED DESCRIPTION

Computer resources, such as databases and application programs, often expose interfaces through which computer programs can access the computer resources. For example, a word processing program may expose an interface (e.g., an application programming interface) through which other computer programs can invoke the services of the word processing program. Through the exposed interface, the other computer programs can invoke the services of the word processing program to, for example, display a document within a window of the other computer program. As another example, a database may provide an object-oriented interface through which other computer programs can access data within the database. If the database is relational, then the object-oriented interface may provide access to an object for each table within the database. The object may have functions for retrieving and modifying the rows within the table.

The use of interfaces to access computer resources helps ensure that accessing computer programs can be developed independently of the actual implementation of the computer resource. In particular, the interface defines the way the computer resource is accessed independent of its implementation. Although some modifications can be made to an implementation without changing the interface, many modifications require a resulting change in the interface. In particular, some exposed interfaces are generated automatically. For example, a relational database may have an object-oriented interface generated automatically. Every time the schema of the relational database is modified, however, a new object-oriented interface is generated. This automatic generation of the interface may decrease the costs for the provider of the relational database, but it may increase costs for the provider's customers because of the need to frequently change their accessing computer programs.

When an interface is modified, the accessing computer programs typically need to be changed to accommodate the modifications to the exposed interface. The cost of and time needed to change these computer programs can be quite high, especially when many computer programs access the interface. The developers of such accessing computer programs may bear the entire cost of changing the accessing computer programs. These developers may be customers of the providers of the computer resources or they may sell accessing computer programs to customers of the providers. To help reduce the costs to their customers, providers of such computer resources may try to minimize the modifications made to exposed interfaces that necessitates changing the accessing computer programs. As a result, many providers of computer resources may delay making modifications as long as possible. Such delay, however, may deprive the provider of needed revenue and the provider's customers of the enhanced features of the modified computer resources.

It would be desirable to allow providers of computer resources a greater range of modifications that can be made to their computer resources without necessitating a modification to the exposed interface.

BRIEF DESCRIPTION OF THE DRAWINGS

FIG. 6 illustrates a data structure used by a version-independent interface and a corresponding data structure used by a version-dependent interface in one embodiment.

BACKGROUND

Figure 1:
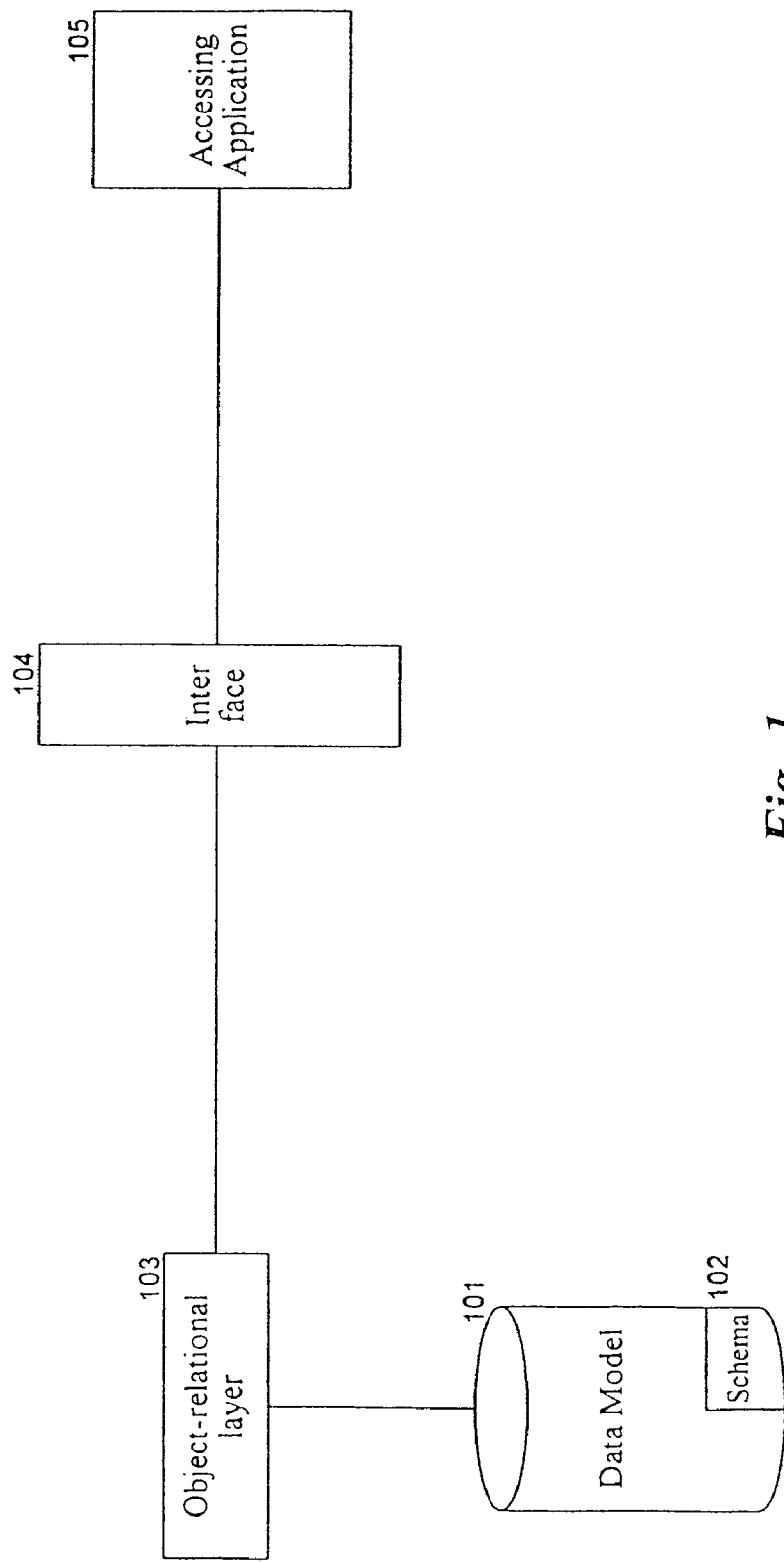
FIG. 1 is a block diagram illustrating a conventional exposed interface.

A method and system for exposing a version-independent interface to a computer resource is provided. In one embodiment, the interface system exposes a version-independent interface to a computer resource, such as a database or computer program. The interface system also provides a version-dependent interface to the computer resource that is typically not exposed. When the computer resource is modified, the version-dependent interface may be modified, but the version-independent interface might not be modified. When the version-dependent interface is modified, a mapping is generated between the version-independent interface and the version-dependent interface. In particular, the elements (e.g., tables, objects, fields, and data members) of the version-independent interface are mapped to elements of the version-dependent interface. When an accessing computer program uses the version-independent interface (e.g., invokes a function of an API) to request services of the computer resource, the system uses the mapping to map the request to a request that is appropriate for the version-dependent interface. In this way, the underlying computer resources can be modified in such a way that would normally change their exposed interfaces, but because of the use of the version-dependent interface, the version-independent interface, and the mapping, the exposed version-independent interface does not need to be modified and thus the accessing computer programs do not need to be changed.

A method and system for automatically mapping hierarchically organized information from a source hierarchy to a destination hierarchy may be used to generate the mapping between a version-dependent interface and a version-independent interface. The hierarchically organized information may represent an object-oriented interface to a relational database or other computer resource. The source hierarchy may represent an internal interface, and the destination hierarchy may represent an external interface. The hierarchy, in one embodiment, may be a tree-like organization. In one embodiment, the system provides an explicit mapping from a component (e.g., object and table) of the source hierarchy to a component of the destination hierarchy. The components of a hierarchy may be uniquely identified by the names of the components in the path from the root of the hierarchy to the component. The system may automatically map components of the source hierarchy, which are not explicitly mapped (e.g., by a person), to components of the destination hierarchy. In particular, the system may identify a corresponding component of the destination hierarchy that has the same name as the component of the source hierarchy. If so, the system automatically maps the two components, referred to as implicit mapping. Components may correspond when their ancestor components map to corresponding ancestor components of the hierarchies. In addition, when components are mapped (i.e., explicitly or implicitly), their fields (e.g., data members of objects) may be automatically mapped when the fields have the same name. Also, the component names and field names may be assigned aliases to assist in the automatic mapping of elements (e.g., components and fields) with matching names or aliases. The use of implicit mapping may assist a developer of an accessing computer program to customize a version-independent or external interface.

This automatic mapping may be used to help developers of accessing computer programs customize the computer resources. In the case that the computer resource is a relational database, the developer may want to add an additional field to the relational database. After adding the field, the developer may run a program to automatically generate the version-dependent interface that represents a source hierarchy. The version-dependent interface will have the new field. The developer can then customize the version-independent interface or destination interface to add the new field. The developer can use the same map that was used to map the interfaces before adding the new field to map the interfaces after adding the new field. The new field will be automatically mapped assuming the field name in the interfaces match. Such automatic mapping simplifies the customization of computer resources by developers of accessing computer programs and simplifies the adding of the customizations to new versions of the computer resources.

The automatic mapping also helps developers apply their customizations to upgraded versions of the computer resources. When a developer receives the upgraded version and its new mapping between the version-dependent interface and the version-independent interface, the developer can apply the customizations to the upgraded version. The developer can, however, use the new mapping without modification just like the developer used the previous mapping without modification. The fields added by the customization will be automatically mapped to the customized version-independent interface. Thus, the developer need not change the mapping or the custom version-independent interface when a computer resource is upgraded.

FIG. 1 is a block diagram illustrating a conventional exposed interface. In this example, the exposed interface 104 provides access to a data model 101, which in this example is a relational database, via the object-relational layer 103. The accessing application 105 invokes the functions defined by the exposed interface. In one embodiment, the object-relational layer may provide an object for each table in the relational database as defined by schema 102. For example, if the schema defines an account table with a name field and an organization field, then the object may be named "account" and include methods to add a new account record to the account table, to delete an account record from the account table, or to modify an account record of the account table. The parameters of the methods may include the values for the name field and the organization field. The interface layer may include an interface for each table defined by the schema. The following is an example definition of an interface for the account object.

interface account {
   void add (key, fields);
   void delete (key);
   void modify (key, fields);
}

The fields parameter may be a data structure that includes a data element for each field of the account table. One skilled in the art will appreciate that many different interfaces may be defined for such a relational database. For example, an interface to a table may have a get and a set method for each field of the table, and the interface may have methods for defining transactions, committing transactions, and rolling back transactions.

Figure 2:
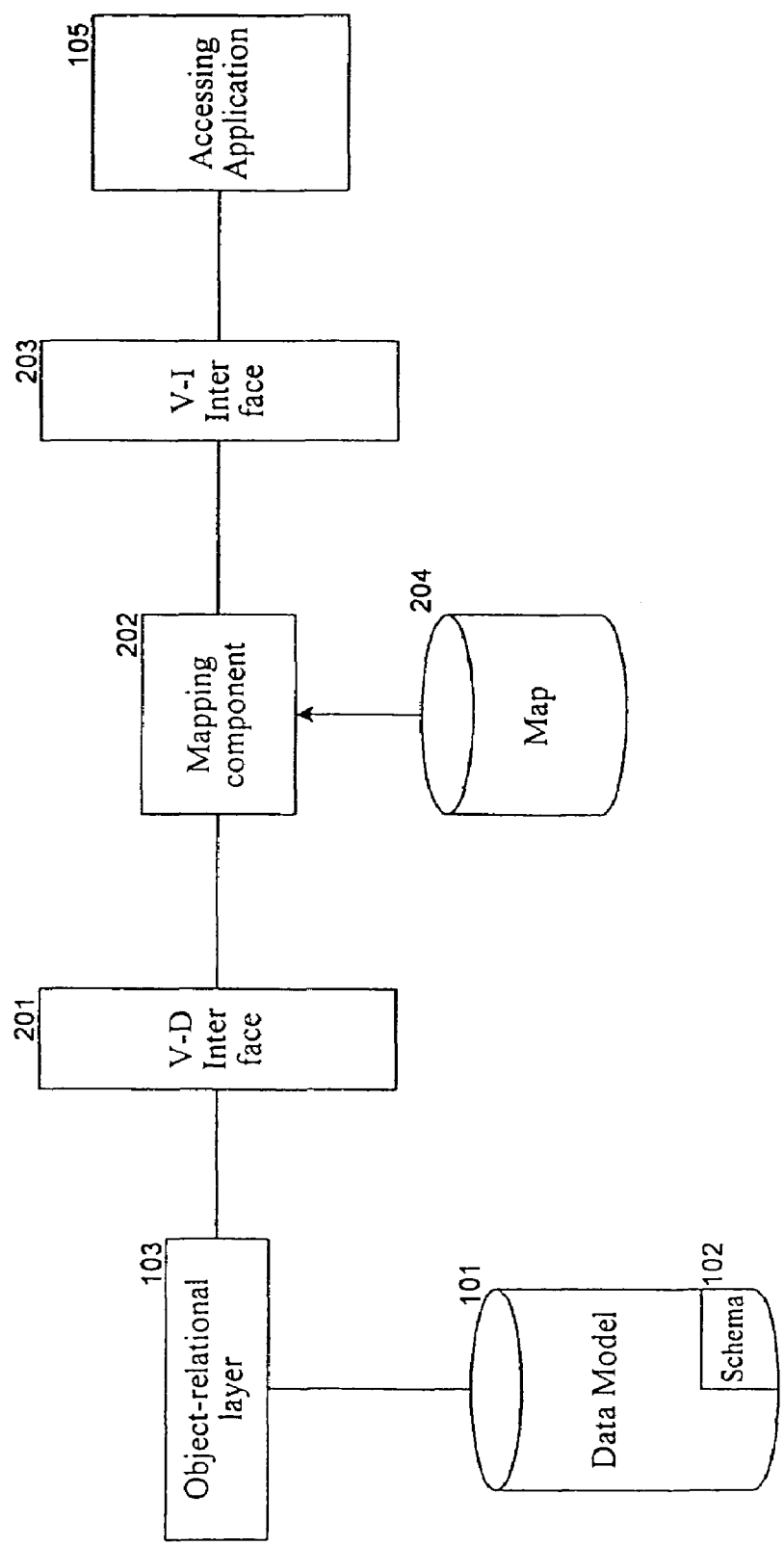
FIG. 2 is a block diagram illustrating an exposed interface to a database using a version-independent interface in one embodiment.

FIG. 2 is a block diagram illustrating an exposed interface to a relational database using a version-independent interface in one embodiment. In this example, the interface 104 of FIG. 1 is replaced by a version-dependent interface 201, a mapping component 202, a version-independent interface 203, and a map 204. The data model 101, the schema 102, the object-relational layer 103, and the accessing application 105 may be the same as in FIG. 1. The version-independent interface is an interface that is intended to be generally static across multiple versions of the data model (or more generally, the computer resource). The version-dependent interface may be automatically generated in the same manner as interface 104 was generated. Initially, the version-independent interface may be the same as the version-dependent interface. As the data model is modified, the version-dependent interface changes correspondingly. For example, to accommodate multiple instances of the organization field for a single account, the organization field in the account table may be replaced by an organization table that is a child table of the account table. If so, the version-dependent interface, after being automatically generated, will have a different interface from the version-independent interface. The mapping component allows for the mapping between the tables and fields of the version-dependent interface and the version-independent interface. (The version-dependent interface corresponds to the schema of the data model, and the version-independent interface corresponds to a schema of a different data model that is not implemented.) Continuing with the example of adding a new organization table, the map 204 may specify that a record (or row) of the organization table designated as the primary organization record may map to the organization field of the account table in the version-independent interface. (This mapping may have been explicitly defined by the provider of the relational database. That is, a person specified the mapping.) Thus, when the accessing application requests an account record from the account table using the version-independent interface, the mapping component recognizes that the organization field of the version-independent interface maps to a primary record of the new organization table and invokes the version-dependent interface for that organization table to retrieve the primary organization record. The mapping component then supplies the organization field from that primary organization record as the organization field of the account table in the version-independent interface.

Figure 3:
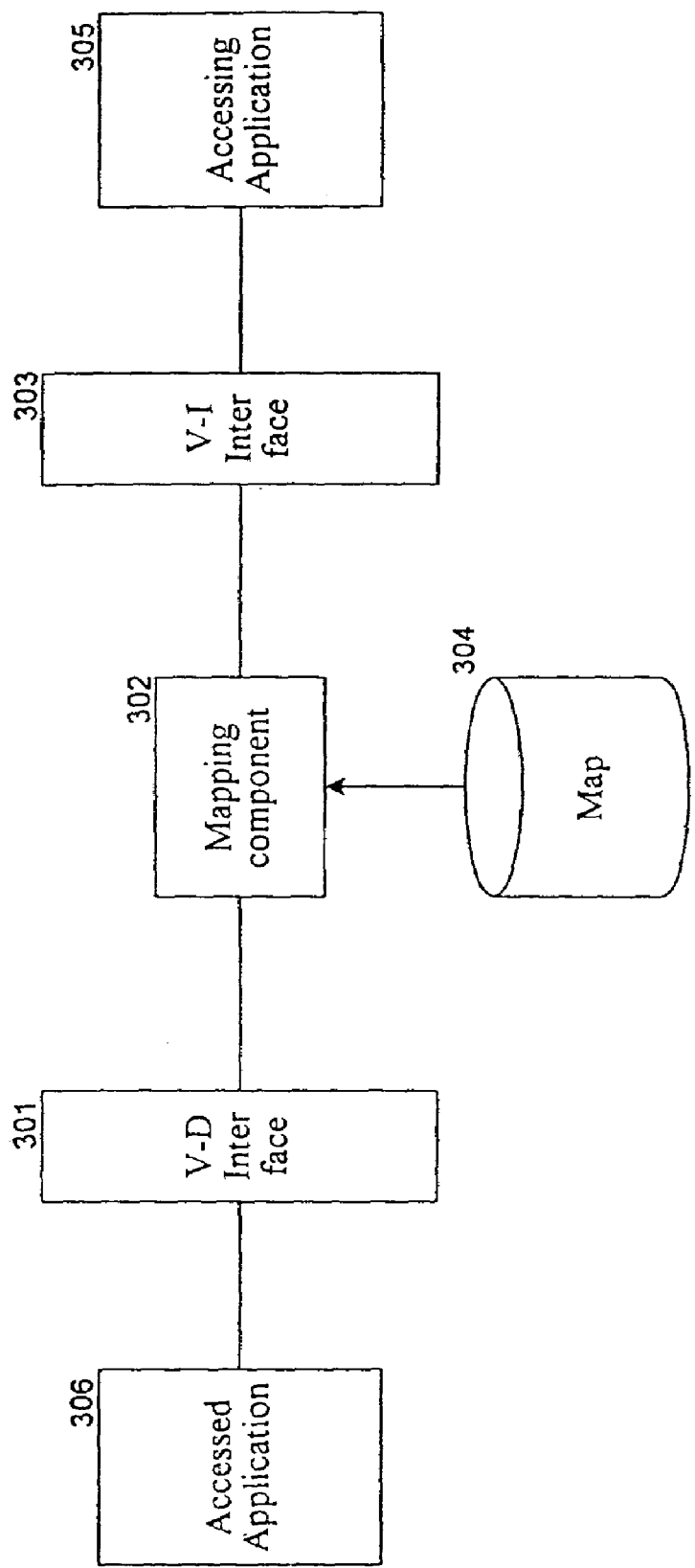
FIG. 3 is a block diagram illustrating an exposed interface to an application program using a version-independent interface in one embodiment.

FIG. 3 is a block diagram illustrating an exposed interface to an application program using a version-independent interface in one embodiment. The accessed application 306 exposes a version-dependent interface 301 that is mapped to a version-independent interface 303 via the mapping component 302 and the map 304. The mapping of the version-dependent interface for an application program to the version-independent interface occurs in much the same way as it does for a version-independent interface to a relational database as described by FIG. 2. The interfaces may provide functions with parameters in a manner similar to the interface to the relational database.

Figure 4:
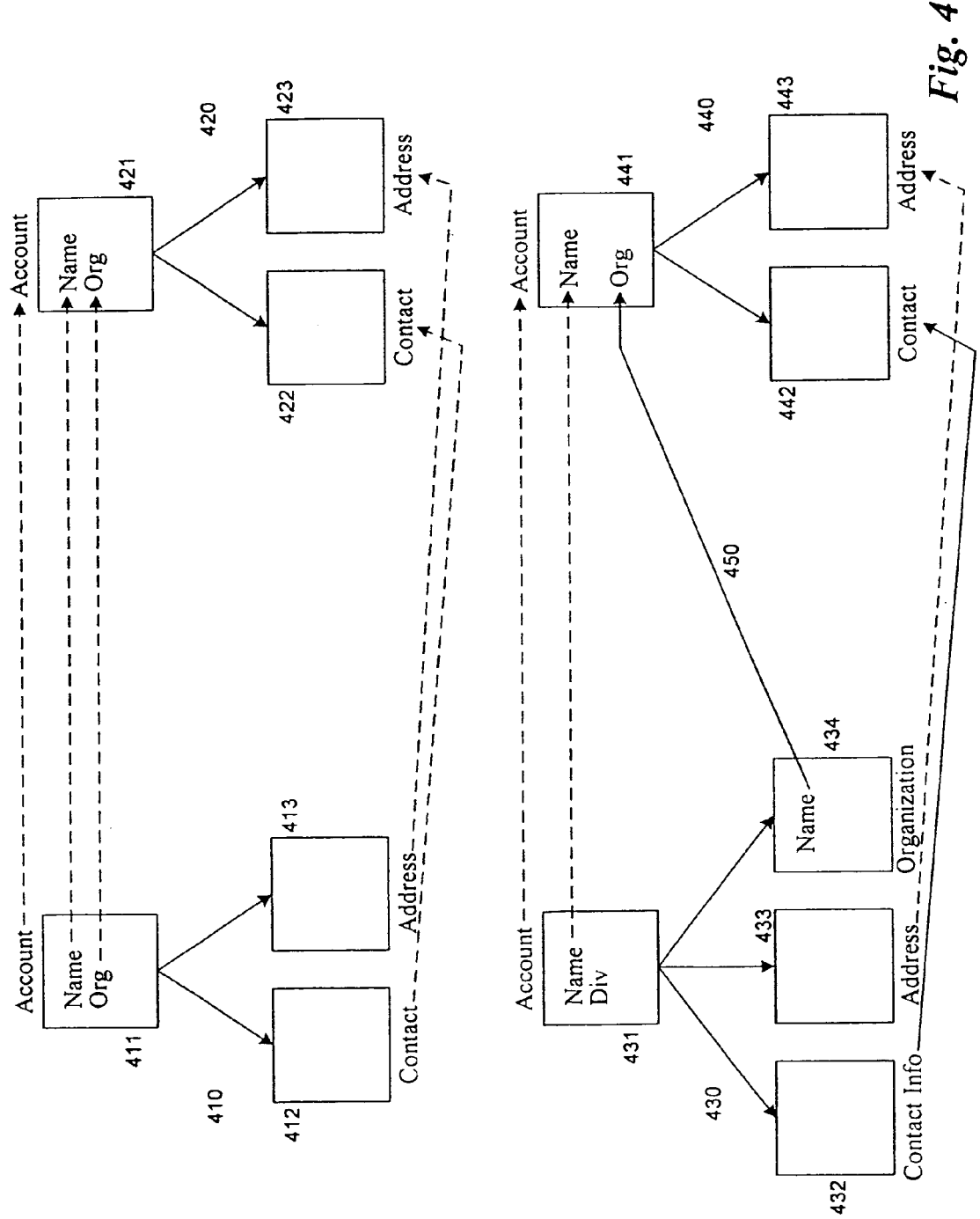
FIG. 4 is a block diagram illustrating a mapping process between a version-independent interface and a version-dependent interface in one embodiment.

FIG. 4 is a block diagram illustrating a mapping process between a version-dependent interface and a version-independent interface in one embodiment. In this example, the version-dependent interface 410 includes an account table 411, a contact table 412, and an address table 413. The account table includes a name field and an organization field. The version-independent interface 420 has the same tables and fields of the version-dependent interface. The dashed lines between the table names and the field names of the version-dependent interface 410 and the version-independent interface 420 indicate that the corresponding elements (e.g., tables and fields) can be automatically mapped by the mapping component. Because the underlying schemas for the interfaces are the same, all elements of one interface are automatically mapped to their corresponding elements of the other interface.

The version-dependent interface 430 represents a modification to the data model in which an organization table 434 has been added as a child table of the account table 431. In addition, a division field has been added to the account table, and the name of the "contact" table 412 has been changed to the "contact information" table 432. In this example, the primary record of the organization table 434 of the version-dependent interface is explicitly mapped to the organization field of the account table 441 of the version-independent interface as indicated by solid line 450. In addition, the contact information table 432 is explicitly mapped to the contact table 442 as indicated by solid line 451. The account table 431, the address table 433, and the name field of the account table 431 of the version-dependent interface can be automatically mapped to the corresponding elements in the version-independent interface as indicated by the dashed lines. In this example, there is no element of the version-independent interface that corresponds to the new division field of the version-dependent interface and thus the new division field is not mapped. In this case, if a developer of an accessing computer program wants to access the division field, then the developer could add that field to the account table 441 and the field would be mapped automatically. The elements of a version-dependent interface may be explicitly mapped to elements of a version-independent interface as described in U.S. patent application Ser. No. 09/818,015, entitled "Declarative Data Transformation Engine," filed on Mar. 26, 2001, which is hereby incorporated by reference.

Figure 5:
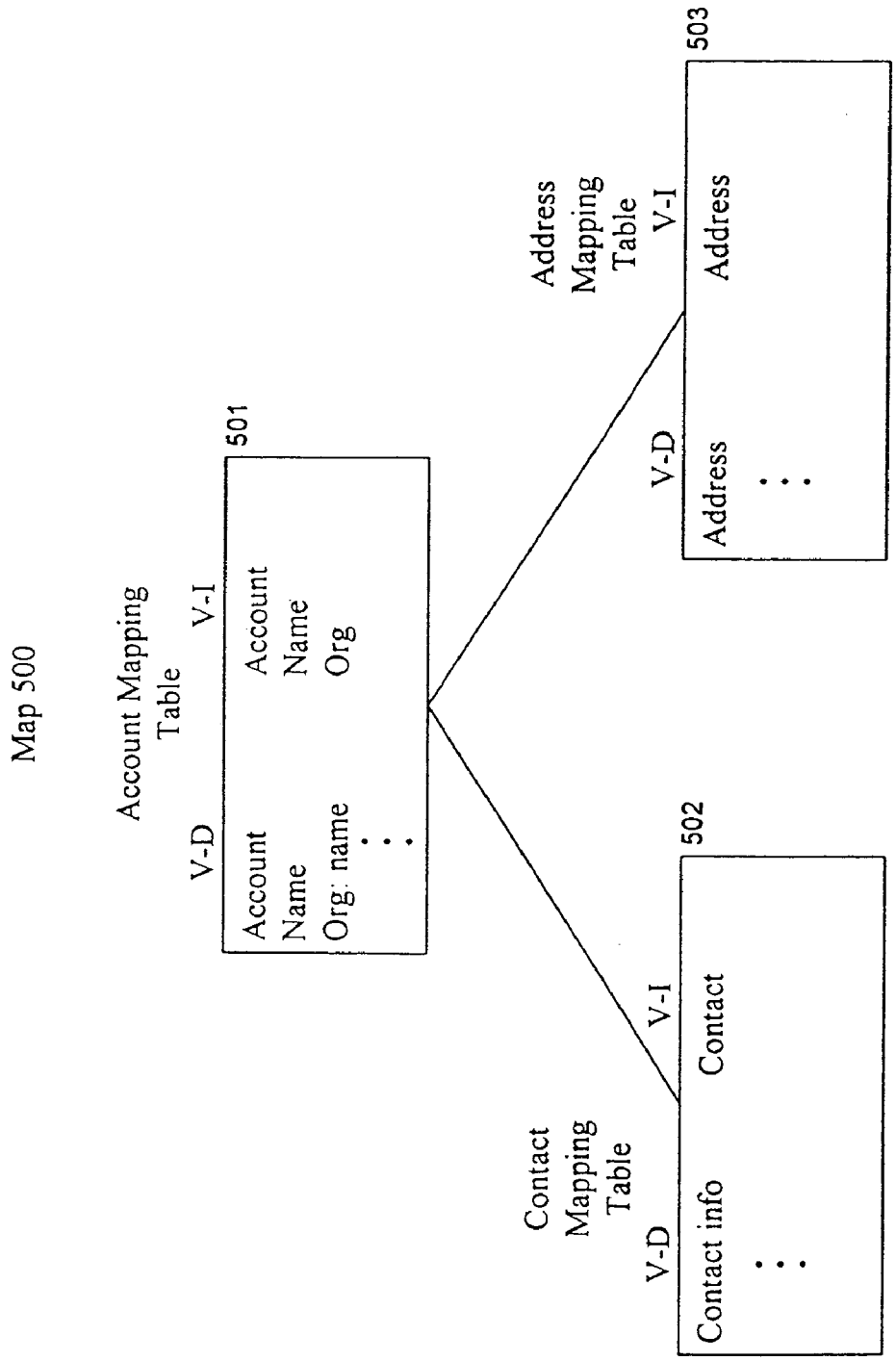
FIG. 5 is a block diagram illustrating a map between a version-dependent interface and a version-independent interface in one embodiment.

FIG. 5 is a block diagram illustrating a map between a version-dependent interface and a version-independent interface in one embodiment. In this example, the map contains a mapping table for each interface of the version-independent interface. The account mapping table 501 indicates the account table in the version-dependent interface maps to the account table of the version-independent interface. The account mapping table also indicates that the name field of the account table in the version-dependent interface maps to the name field of the account table in the version-independent interface and that the name field of the organization table of the version-dependent interface maps to the organization field of the account table in the version-independent interface. The contact mapping table 502 indicates that the "contact information" table of the version-dependent interface maps to the contact table of the version-independent interface. The address mapping table 503 indicates that the address table of the version-dependent interface maps to the address table of the version-independent interface. One skilled in the art will appreciate that this map includes both explicitly generated mappings and automatically generated mappings. In one embodiment, the automatically generated mappings need not be stored in the map but may be generated at run time on an as-needed basis. One skilled in the art will appreciate that automatic mapping can be used with mapping technologies other than database-related technologies. For example, automatic mapping can be used with custom code of a standard programming language (e.g., C++, JAVA, and JAVASCRIPT) and XML Stylesheet Language Transformations ("XSLTs").

FIG. 6 illustrates a data structure used by a version-independent interface and a corresponding data structure used by a version-dependent interface in one embodiment. The data structures specify the format of a message that can be received by the interfaces. The data structure in this example is in XML format and specifies a function (or command) along with its parameters to be invoked by an object-relational layer, accessed application program, or other computer resource. Data structure 601 is a version-independent data structure that indicates that the account record for the company Acme is to have its organization name changed to "sales." The data structures contain XML tags (e.g., "account") that define in which tables and fields to store the data contained in the data structure. The format of the data structures may be defined by various XML schemas or document type definitions. One skilled in the art will appreciate that various standards, such as the Simple Object Access Protocol, the Common Object Request Broker Architecture, or the Component Object Model may be used to define the formats of the interface. Data structure 602 is a corresponding version-dependent data structure. In this example, the organization tag of data structure 601 corresponding to the organization field of the account table has been replaced by the organization tag of data structure 602 corresponding to the child organization table and a nested name tag corresponding to the name field of the organization table.

Figure 7:
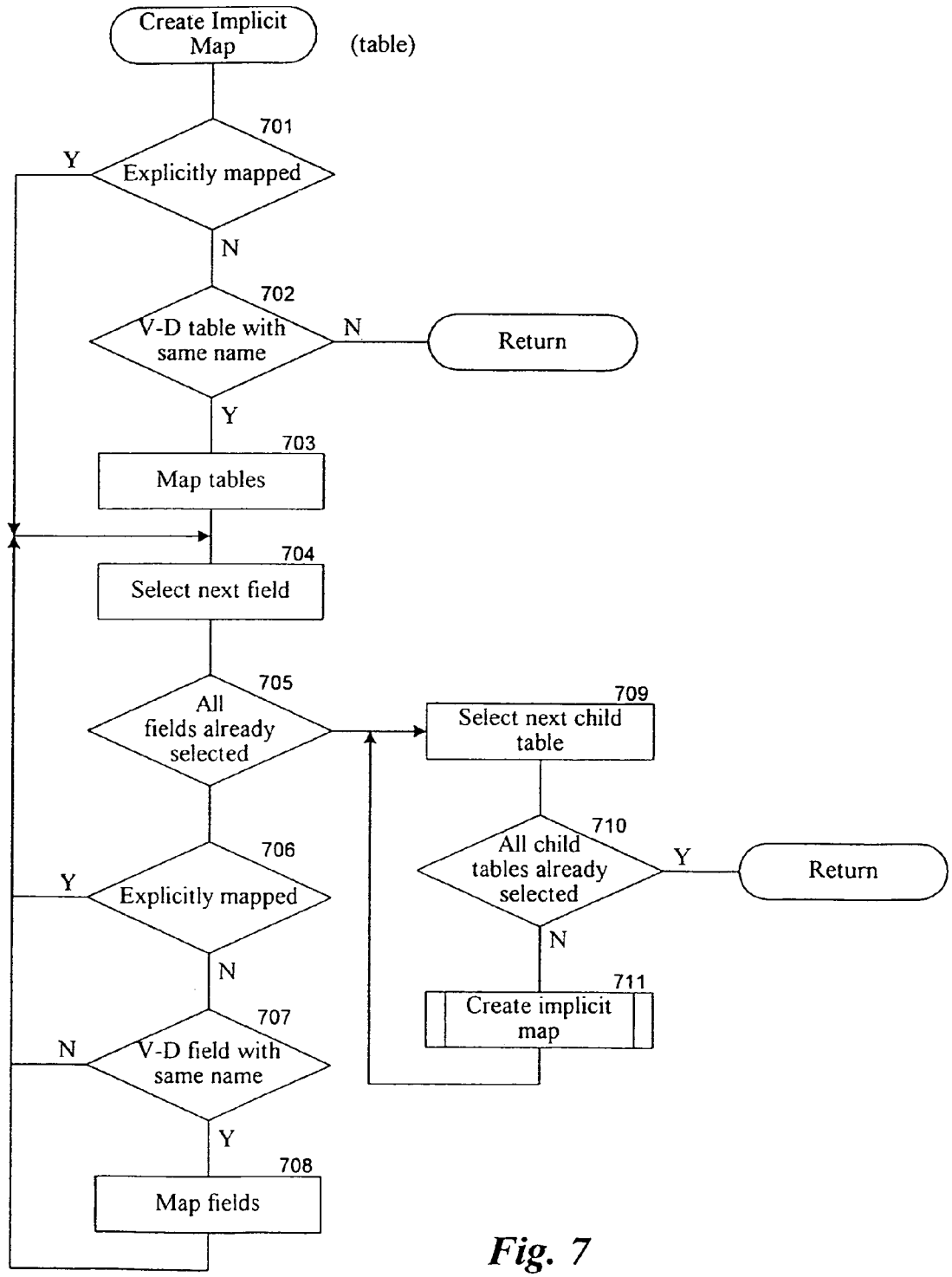
FIG. 7 is a flow diagram illustrating processing to create an implicit or automatic map in one embodiment.
Figure 8:
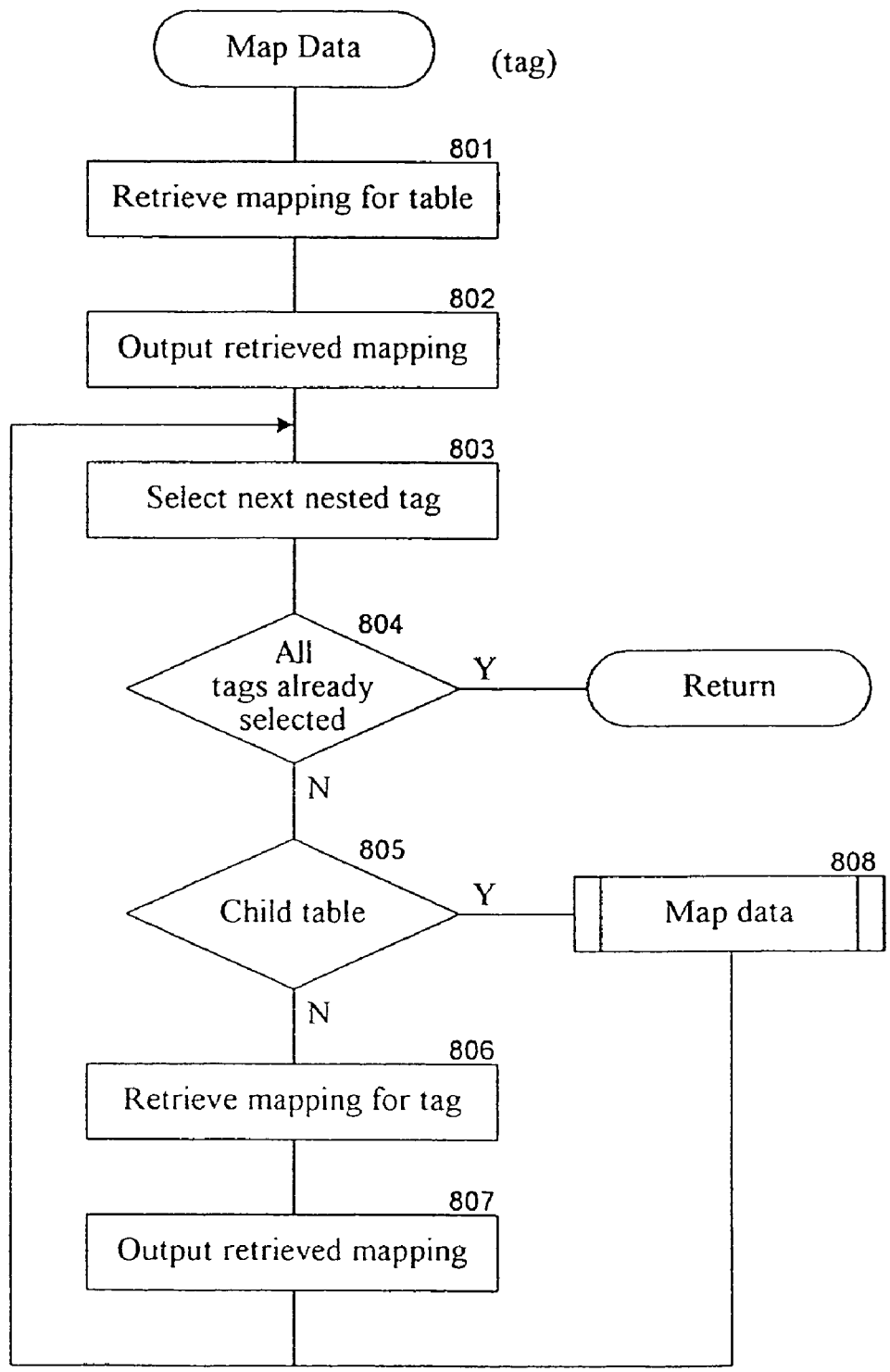
FIG. 8 is a flow diagram illustrating the processing of the mapping component in one embodiment.

FIGS. 7 and 8 are flow diagrams illustrating processing of the system in one embodiment. The illustrated processing describes overall algorithms. One skilled in the art will appreciate that the actual implementation of the algorithms can vary from the described algorithms. For example, the processing is illustrated as a recursive algorithm, but an actual implementation need not be recursive. The system may be implemented on a computer that may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be transmitted via a data transmission medium, such as a signal on a communications link. Various communications channels, such as the Internet, a local area network, a wide area network, or a point-to-point dial-up connection, may be used to communicate between the interfaces, computer programs, and databases.

FIG. 7 is a flow diagram illustrating processing to create an implicit or automatic map in one embodiment. The algorithm is initially passed a root table of a hierarchy of the version-independent interface. The processing of the algorithm may be repeated for each root table in the hierarchy of the interface. In decision block 701, if the passed table has been explicitly mapped, then the algorithm continues at block 704, else the algorithm continues at block 702. In decision block 702, if there is a corresponding version-dependent table with the same name (or other matching identifier such as an alias), then the algorithm continues at block 703, else the algorithm completes because the passed table cannot be automatically mapped. In block 703, the algorithm automatically maps the version-dependent table to the passed version-independent table. In blocks 704–708, the algorithm loops automatically mapping each field of the passed table as appropriate. In block 704, the algorithm selects the next field of the passed table. In decision block 705, if all the fields have already been selected, then the algorithm continues at block 709, else the algorithm continues at block 706. In decision block 706, if the selected field has been explicitly mapped to a field of the version-dependent interface, then the algorithm loops to block 704 to select the next field, else the algorithm continues at block 707. In decision block 707, if the mapped-to table in the version-dependent interface has a field with a matching name (or other identifier) as the selected field, then the algorithm continues at block 708, else the algorithm loops to block 704 to select the next field. In block 708, the algorithm automatically maps the fields and loops to block 704 to select next field. In blocks 709–711, the algorithm selects each child table of the passed table and recursively invokes the algorithm for that child table. In block 709, the algorithm selects the next child table of the passed table. In decision block 710, if all the child tables have already been selected, then the algorithm returns, else the algorithm continues at block 711. In block 711, the algorithm recursively invokes the algorithm passing the selected child table and then loops to block 709 to select the next child table.

FIG. 8 is a flow diagram illustrating the processing of the mapping component in one embodiment. In this example, the mapping component is passed a tag of a version-independent data structure that is in XML format. The passed tag represents a table and may contain nested tags for fields and child tables. In block 801, the algorithm retrieves the mapping for the tag from the map store. In block 802, the algorithm outputs the mapped tag as the version-dependent message. In blocks 803–808, the algorithm loops mapping each nested tag of the passed tag as appropriate. In block 803, the algorithm selects the next nested tag. In decision block 804, if all the nested tags have already been selected, then the algorithm returns, else the algorithm continues at block 805. In decision block 805, if the selected tag corresponds to a child table, then the algorithm continues at block 808, else the algorithm continues at block 806. In block 806, the algorithm retrieves the mapping for the selected tag. In block 807, the algorithm outputs the mapped tag and loops to block 803 to select the next tag. In block 808, the algorithm recursively invokes this algorithm passing the selected tag representing the child table and then loops to block 803 to select the next tag.

From the above, it will be appreciated that various embodiments of the invention have been described for purposes of illustration. One skilled in the art will appreciate that modifications may be made without deviating from the spirit and scope of the invention. Accordingly, the invention is not limited except as by the appended claims.

The invention claimed is:

1. A method in a computer system for exposing a version-independent interface to a computer resource, the method comprising:

providing the version-independent interface to the computer resource, the version-independent interface for use by an accessing program to access the computer resource;

modifying the computer resource;

generating a version-dependent interface to the modified computer resource; and generating a mapping between named elements of the version-independent interface and named elements of the version-dependent interface, wherein the generated mapping includes an explicit mapping of elements with one name in the version-dependent interface and another name in the version-independent interface and an implicit mapping of elements with a matching name in both the version-dependent interface and the version-independent interface.

2. The method of claim 1 wherein the computer resource is a database and the modifying of the computer resource includes changing a schema for the database.

3. The method of claim 1 wherein the computer resource is a program and the modifying of the computer resource includes changing an exposed interface of the program.

4. The method of claim 1 wherein an interface specifies a function and a parameter.

5. The method of claim 1 wherein the named elements are part of an XML-based schema for the version-independent interface and the version-dependent interface.

6. The method of claim 1 wherein elements with matching names are objects.

7. The method of claim 1 wherein elements with matching names are child objects of objects that map to each other.

8. The method of claim 1 wherein elements with matching names are fields of objects that map to each other.

9. The method of claim 1 wherein the computer resource is a data model and the modifying of the computer resource includes adding a field to an existing object of the data model.

10. The method of claim 1 wherein the computer resource is a data model and the modifying of the computer resource includes adding a child object to an existing object.

11. The method of claim 1 including deactivating an object of the version-independent interface.

12. The method of claim 1 including deactivating a field of an object of the version-independent interface.

13. The method of claim 1 wherein the implicit mapping is generated at run time when the version-independent interface is accessed.

14. The method of claim 1 wherein the implicit mapping for an element is generated when the element is accessed.

15. A computer-readable medium containing data, comprising:

a definition of a version-independent interface to a computer resource, the version-independent interface for use by an accessing program to access the computer resource;

a modified computer resource;

a definition of version-dependent interface to the modified computer resource; and a mapping between the version-independent interface and the version-dependent interface so that named elements of the version-independent interface can be mapped to named elements of the version-dependent interface for accessing the modified computer resource, wherein the mapping includes an explicit mapping of elements with one name in the version-dependent interface and another name in the version-independent interface and an implicit mapping of elements with a matching name in both the version-dependent interface and the version-independent interface.

16. The computer-readable medium of claim 15 wherein the computer resource is a database and the modified computer resource includes a change of a schema for the database.

17. The computer-readable medium of claim 15 wherein the computer resource is a program and the modified computer resource includes a change of an exposed interface of the program.

18. A system for exposing an interface to a computer resource, comprising:
 a computer-readable medium comprising a means for defining a version-independent interface to the computer resource, the version-independent interface for use by an accessing program to access the computer resource;
 a computer-readable medium comprising a means for receiving a modified computer resource;
 a computer-readable medium comprising a means for defining a version-dependent interface to the modified computer resource; and
 a computer-readable medium comprising a means for defining a mapping between named elements of the version-independent interface and named elements of the version-dependent interface, wherein the mapping includes an explicit mapping of elements with one name in the version-dependent interface and another name in the version-independent interface and an implicit mapping of elements with a matching name in both the version-dependent interface and the version-independent interface.

19. The system of claim 18 wherein the computer resource is a database and the modified computer resource includes a change of a schema for the database.

20. The system of claim 18 wherein the computer resource is a program and the modified computer resource includes a change of an exposed interface of the program.

21. A method in a computer system for mapping hierarchically organized information from a first hierarchy to a second hierarchy, the information being organized into components with identifiers, the method comprising:
 determining whether a component of the first hierarchy without an explicit mapping to a component of the second hierarchy has a corresponding component of the second hierarchy that has an identifier that matches the identifier of the component of the first hierarchy; and
 when it is determined that a component of the first hierarchy without an explicit mapping to a component of the second hierarchy has a corresponding component of the second hierarchy that has an identifier that matches the identifier of the component of the first hierarchy, mapping that component of the first hierarchy to that component of the second hierarchy, wherein the mapping is an explicit mapping of that component with one name in the first hierarchy to that component with another name in the second hierarchy.

22. The method of claim 21 wherein a component of the first hierarchy corresponds to a component of the second hierarchy when it is in the same relative position in both hierarchies.

23. The method of claim 21 wherein identifiers match when their names are the same.

24. The method of claim 21 wherein identifiers match when a name matches an alias of another name.

25. The method of claim 21 wherein the identifiers include names and aliases and the identifiers match when their aliases match.

26. The method of claim 21 wherein each component has one or more fields and including:
 determining whether there is a field of the component of the second hierarchy that has an identifier that matches an identifier of the field of the component of the first hierarchy; and
 when it is determined that there is a field of the component of the second hierarchy that has an identifier that matches the identifier of the field of the component of the first hierarchy, mapping that field of the component of the first hierarchy to that field of the component of the second hierarchy.

27. The method of claim 26 wherein identifiers match when names are the same.

28. The method of claim 26 wherein the identifiers include names and aliases and match when names or aliases are the same.

29. The method of claim 21 wherein the mapping is performed in response to a request to access a component.

30. A system for mapping hierarchically organized information from a first hierarchy to a second hierarchy, the information being organized into components with identifiers, comprising:
 a computer-readable medium comprising a means for determining whether a component of the first hierarchy without an explicit mapping has a corresponding component of the second hierarchy that has an identifier that matches the identifier of the component of the first hierarchy; and
 a computer-readable medium comprising a means for when it is determined that a component of the first hierarchy without an explicit mapping has a corresponding component of the second hierarchy that has an identifier that matches the identifier of the component of the first hierarchy, mapping that component of the first hierarchy to that component of the second hierarchy, wherein the mapping is an explicit mapping of that component with one name in the first hierarchy to that component with another name in the second hierarchy.

31. A method for applying a customization for a computer resource to an upgraded version of the computer resource, the method comprising:
 receiving a definition of a version-independent interface for the computer resource wherein elements of the version-independent interface can be mapped to elements of a version-dependent interface, the version-independent interface for use by an accessing program to access the computer resource;
 customizing the computer resource and the version-independent interface, the customized computer resource having a customized version-dependent interface;
 receiving an upgrade to the computer resource along with a definition of an upgraded version-dependent interface wherein elements of the upgraded version-dependent interface can be mapped to elements of the version-independent interface;

customizing the upgraded computer resource, the customized-upgraded computer resource having a customized-upgraded version-dependent interface wherein customized elements of the customized-upgraded version-dependent interface can be automatically mapped to customized elements of the customized version-independent interface, wherein the mapping includes an explicit mapping of elements with one name in the customized-upgraded version-dependent interface and another name in the customized version-independent interface and an implicit mapping of elements with a matching name in both the customized-upgraded version-dependent interface and the customized version-independent interface.

32. The method of claim 31 wherein the computer resource is a database.

33. The method of claim 31 wherein the computer resources is a program.

34. The method of claim 31 wherein the automatic mapping is performed when the customized version-independent interface is accessed.

* * * * *